Dec. 7, 1926.
DE WITT E. YATES
1,609,343
MEANS FOR GRINDING PISTON RINGS
Filed Feb. 12, 1923
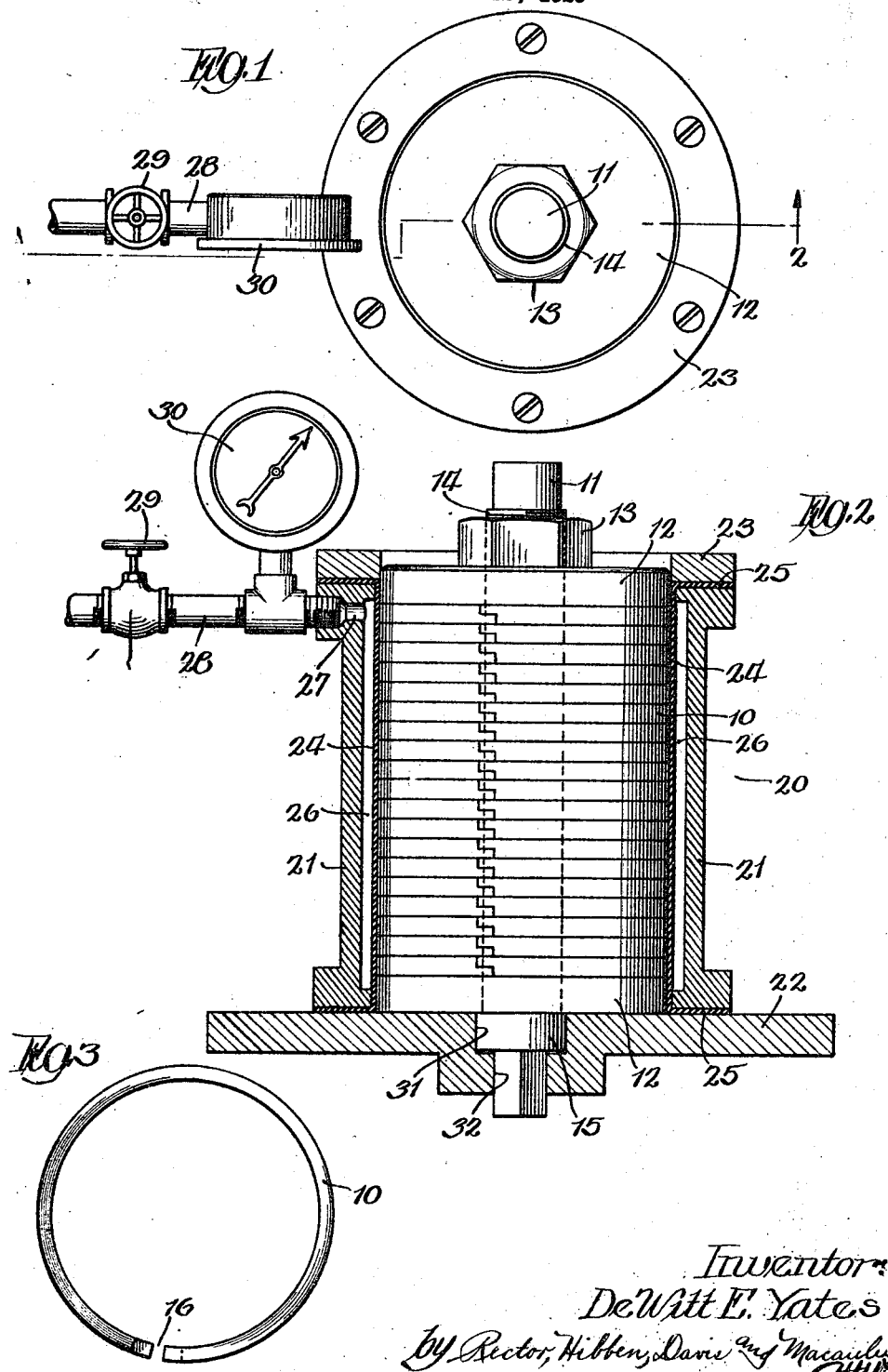
Inventor:
DeWitt E. Yates
by Rector, Hibben, Davis and Macauley
Attys.

Patented Dec. 7, 1926.

1,609,343

UNITED STATES PATENT OFFICE.

DE WITT E. YATES, OF CHIPPEWA FALLS, WISCONSIN, ASSIGNOR TO INDIANA PISTON RING COMPANY, OF HAGERSTOWN, INDIANA, A CORPORATION OF INDIANA.

MEANS FOR GRINDING PISTON RINGS.

Application filed February 12, 1923. Serial No. 618,747.

This invention relates to improvements in piston ring manufacture and its purpose is to provide a new process of machining or grinding the piston rings, and an improved form of apparatus for use in that process whereby greater accuracy is obtained in the manufacture of the rings.

In the usual method of manufacturing piston rings, a number of the rings, which have been subjected to the preliminary manufacturing operations, are stacked together and compressed by forcing them into a metal cylinder of the correct diameter to close tightly all of the gaps or joints of the rings. The rings are then clamped tightly on an arbor, removed from the cylinder and turned or ground to the desired diameter. In this method, the turning or grinding takes place while the rings are compressed by unequal radial forces because the rings are imperfect when they are compressed in the rigid metal cylinder. The result is that the piston rings manufactured by this usual method are found to vary considerably from true circles, on their outer surfaces, if they are later compressed by equal radial forces throughout the circumferences of the rings.

It is the principal object of this invention to provide a method of grinding piston rings whereby they are compressed by equal radial forces during the operation of grinding the outer surfaces of the rings so that the resulting rings exert equal or uniform outward pressures against the cylinder walls when they are mounted on the pistons of an engine. A further object is to provide an improved form of apparatus for use in this process. A further object is to provide improved means for compressing the rings by uniform radial pressures throughout their circumferences. Other objects relate to various features of a process and apparatus which will appear more clearly hereinafter.

The nature of the invention will be understood from the following specification in which the method of forming the piston rings is explained in connection with the accompanying drawings illustrating one form of the improved apparatus. In the drawing Fig. 1 shows a top plan view of the cylinder or jig in which the piston rings are confined and compressed; Fig. 2 shows a vertical section on the line 2—2 of Fig. 1, and Fig. 3 shows a plan view of one form of piston ring adapted to be operated on by the means and method of the present invention.

The method of the present invention is designed to be employed as a finishing process after the preliminary operations of forming the piston ring have been performed. These preliminary operations may be carried out acording to any of the suitable methods known in the art by which the rings are reduced to their finished form except on their outer surfaces. For example, a metal stock of suitable form may be machined to form a hollow cylinder having the same inside and outside diameters that the finished rings are to have when they are expanded. Solid rings of the required width are then cut off from the cylinder, after which a gap is cut or milled in each ring. Instead of being cut from a cylinder, the rings may be cast individually and machined. The rings are then forced into a cylinder having the proper inside diameter to close the gaps of all the rings and the rings are then clamped on an arbor which is held concentric with the inside surface of the cylinder, after which the rings, secured on the arbor, are removed from the cylinder and are ready for the finishing operation. In this method of preliminary treatment or in any other method now known to the art, the rings are imperfect until they have been turned or ground on their outer surfaces while contracted, and if they are not contracted by uniform radial pressures, they are still imperfect after the final operation. It is the purpose of this invention to overcome the defects heretofore present in the final grinding operation.

Referring to the drawings, the piston rings 10 which have been subjected to the preliminary operations as described above, are shown in position on an arbor 11, where they are clamped between the collars or end plates 12 by means of a clamping nut 13 engaging the threaded portion 14 of the arbor. The arbor is provided at the end opposite the nut with an annular flange 15 which overlaps the lower end plate 12 and opposes the action of the nut 13 when the nut has tightened on the arbor. The piston rings 10 are shown as being of the concentric type having gaps 16 formed therein although it will be understood that the invention is adapted for use with substantially any piston ring whether it be concentric, eccentric, or of other form.

The piston rings which are compressed and clamped on the arbor as heretofore described are adapted to be placed in a jig 20 comprising an outer cylinder 21 closed at its lower end by a plate 22 and having an annular collar or ring 23 secured to the upper end thereof. An inner cylinder 24, of india rubber or the like, is mounted within the cylinder 21 and stretched longitudinally thereof with the ends of the rubber tube flared outwardly as shown at 25 and clamped between the ends of the cylinder 21 and the members 22 and 23 which are secured thereto by bolts or the like. The cylinder 21 is counter-bored on its inner side to form an annular chamber 26 on the outer side of the rubber cylinder 24 and compressed air or other fluid is adapted to be introduced into this chamber through an inlet 27 leading from a supply pipe 28 having a regulating valve 29 connected therein. The pressure of the air may be indicated by gauge 30.

The arbor carrying the piston rings which have been clamped in position thereon with their joints closed, is inserted in the jig 20 as shown particularly in Fig. 2, the plate 22 at the lower end of the jig being provided with a recess 31 to receive the collar 15 and with a square aperture 32 to receive the lower square extremity of the arbor. The piston rings are concentric with the arbor and the inner diameter of the tube 24 and the inner diameter of the ring 23 are such as to make a snug fit with the unfinished piston ring, and the arbor and rings are held in alignment with the rubber tube by the ring 23 and the lower plate 22. When the rings are in position in the jig, and after compressed air has been admitted to the chamber 26 at a pressure which is sufficient to hold all of the joints of the piston rings tightly closed, the clamping nut is released and the piston rings are then subjected to equal radial pressures by the compressed fluid acting throughout their circumferences so that they then readjust themselves to the new forces acting upon them. The alignment of the rings is maintained by the resistance of the rubber tube which, as previously stated, is stretched longitudinally of the cylinder 21. While the piston rings are maintained in their readjusted positions by the application of the surrounding fluid pressure, the clamping nut 13 is tightened again to clamp the piston rings securely between the plates 12 while in their readjusted positions. And the arbor and the rings carried thereby are then removed from the jig and placed in a lathe or other machine for the final turning or grinding operation on the outer surface thereof. The stock which needs to be removed in this final operation is comparatively small so that the tension of the rings is not altered materially by this final grinding operation. When the finishing is completed the rings are removed from the arbor and are ready for use.

Since the piston rings which are finished by this process are held in place by equal radial forces when being clamped in position for the finishing turning operation, and are finished on their outer surfaces to form true circles or cylinders while held in that position, it follows that after they are released and are again compressed to the same true circle with their ends meeting, they are again acted upon by equal radial forces and will exert equal radial pressures on the confining means, which in case of an engine cylinder is a true cylinder having an inside diameter the same as the diameter of the outer surfaces of the finished rings. The time required for this finishing operation is comparatively small and a great advantage is gained in that the piston rings exert equal pressures in all directions on the cylinder walls and maintains a tight and more uniform closure between the pistons and the cylinders.

Although one method of carrying out the invention and one form of apparatus for use in that method have been described for purposes of illustration, it will be understood that the invention may be carried out in other ways and by other means without departing from the scope of the appended claims.

I claim—

1. In apparatus for forming piston rings, a rigid cylinder, a rubber cylinder mounted in said rigid cylinder and stretched longitudinally thereof, said cylinders being united at their ends and having an annular chamber between them, means for applying fluid pressure to said annular chamber, a plate secured to the lower end of said rigid cylinder and having a recess therein, and an arbor mounted within said cylinders and having a part engaging said recess.

2. In apparatus for forming piston rings, a rigid cylinder, a rubber cylinder mounted in said rigid cylinder and stretched longitudinally thereof, said cylinders being united at their ends and having an annular chamber between them, means for applying fluid pressure to said annular chamber, a plate secured to the lower end of said rigid cylinder and having a recess therein, an arbor mounted within said cylinders and having a part engaging said recess, a collar secured to the upper end of said cylinder and plates adjustably mounted on said arbor to receive piston rings between them.

3. In apparatus for forming piston rings, a rigid cylinder, a rubber cylinder mounted in said rigid cylinder, said cylinders being united at their ends and having an annular chamber between them, means for applying fluid pressure to said annular chamber, a piston ring supporting arbor extending through said cylinders, and means for holding said arbor against rotation with respect to said rigid cylinder.

4. In apparatus for forming piston rings, a rigid cylinder, a rubber cylinder mounted in said rigid cylinder, said cylinders being united at their ends and having an annular chamber between them, means for applying fluid pressure to said annular chamber, an arbor extending through said rubber cylinder and having a non-circular part, said arbor being adapted to support a plurality of piston rings, a plate secured to one end of said rigid cylinder and having a non-circular aperture adapted to be engaged by the non-circular portion of said arbor, a plate on said arbor adapted to engage one end of the series of piston rings, and means engaging said arbor at the other end of said rigid cylinder for clamping said ring against said last named plate.

DE WITT E. YATES.